US007714460B2

United States Patent
Yabumoto

(10) Patent No.: US 7,714,460 B2
(45) Date of Patent: May 11, 2010

(54) ELECTRIC STEERING LOCK DEVICE

(75) Inventor: Kazuhisa Yabumoto, Yokohama (JP)

(73) Assignee: Alpha Corporation, Yokohama-shi (JP)

( * ) Notice: Subject to any disclaimer, the term of this patent is extended or adjusted under 35 U.S.C. 154(b) by 0 days.

(21) Appl. No.: 12/232,866

(22) Filed: Sep. 25, 2008

(65) Prior Publication Data

US 2009/0084146 A1    Apr. 2, 2009

(30) Foreign Application Priority Data

Sep. 28, 2007  (JP) .............................. 2007-256092

(51) Int. Cl.
B60R 25/00       (2006.01)
(52) U.S. Cl. ..................................... 307/10.2
(58) Field of Classification Search ............... 307/10.2
See application file for complete search history.

(56) References Cited

U.S. PATENT DOCUMENTS

2005/0132765 A1 *  6/2005  Nagae et al. .................. 70/252

FOREIGN PATENT DOCUMENTS

JP     2006-103489       4/2006

\* cited by examiner

*Primary Examiner*—Fritz M Fleming
*Assistant Examiner*—Dru M Parries
(74) *Attorney, Agent, or Firm*—The Nath Law Group; Jerald L. Meyer; Brooks Gifford, III

(57) ABSTRACT

An electric steering lock device includes an operation relay for operating an electric motor, a pair of switching relays for switching the rotating direction of the electric motor, and diodes for energizing each relay connected to a port of a control unit respectively. A steering shaft is unlocked by providing the operation relay in an ON status to allow the electric motor to displace the locking rod in the unlocking direction. The steering shaft is locked by providing the operation relay and the pair of switching relays in an ON status respectively to allow the electric motor to displace the steering rod in the locking direction.

2 Claims, 7 Drawing Sheets

FIG. 7

|  | RY1 | RY2 | RY3 | ELECTRIC MOTOR |
|---|---|---|---|---|
| WHEN UNLOCKING | OFF | OFF | ON | ROTATION IN UNLOCKING DIRECTION |
| WHEN LOCKING | ON | ON | ON | ROTATION IN LOCKING DIRECTION |
| RY1 FAILURE | ON | OFF | OFF | STOP |
| RY2 FAILURE | OFF | ON | OFF | STOP |
| RY3 FAILURE | OFF | OFF | ON | ROTATION IN UNLOCKING DIRECTION |

ELECTRIC STEERING LOCK DEVICE

BACKGROUND OF THE INVENTION

1. Field of the Invention

The present invention relates to an electric steering lock device that locks the rotation of a steering shaft of a vehicle.

2. Description of the Related Art

The conventional electric steering lock device of this type has known as disclosed in Patent Publication 1. This electric steering lock device 100 includes, as shown in FIG. 1, an electric motor 101; a locking rod 103 that is displaced by driving of this electric motor 101 between a lock position at which the rotation of a steering shaft 102 is prevented and an unlock position at which the rotation of the steering shaft 102 is allowed; a controller substrate 104 for performing an operation control of this locking rod 103; an unlocking circuit relay 105; and a locking circuit relay 106.

When a vehicle having the above configuration is desired to be locked to park the vehicle, the locking circuit relay 106 is in an ON status to constitute a locking circuit to rotate the electric motor 101 in a locking direction. As a result, the locking rod 103 is moved from an unlock position to a lock position. This allows a tip end of the locking rod 103 to be engaged with the steering shaft 102 to prevent the rotation of the steering shaft 102. Consequently, the vehicle cannot be maneuvered. When the vehicle having the above configuration is desired to be unlocked on the other hand, the unlocking circuit relay 105 is in an ON status to constitute an unlocking circuit to rotate the electric motor 101 in an unlocking direction. This allows the locking rod 103 to be moved to the unlock position. As a result, the engagement between the locking rod 103 and the steering shaft 102 is cancelled and thus the steering shaft 102 can be rotated freely. Consequently, the vehicle can be maneuvered.

[Patent Publication 1] Japanese Patent Laid-Open Publication No. 2006-103489

SUMMARY OF THE INVENTION

In the above conventional the electric steering lock device 100, the locking rod 103 is maintained in an unlocked status when the vehicle is running for example. However, when the locking circuit relay 106 is unexpectedly in an ON status due to a failure, the electric motor 101 is rotated in the locking direction to prevent the steering shaft 102 from being rotated. In this case, the vehicle cannot be maneuvered, which is dangerous. Thus, failure detection such as a FET provided at the downstream of the electric motor 101 is required in order to secure the safety of the vehicle. This has caused a disadvantage that an additional cost is required by this failure detection circuit such as the FET.

In addition to the method as described above in which the unlocking circuit relay 105, the locking circuit relay 106, the FET and the like are used to operate the electric motor 101, there is another method as shown in FIG. 2 in which a plurality of semiconductors 120 are combined to constitute an H-bridge-type IC 121 to control the operation of an electric motor 122. However, this method also had a disadvantage in that a high cost is required by the H-bridge-type IC 121. Furthermore, the operation of the semiconductors 120 causes, in a battery OFF status, both ends of the terminal of the electric motor 122 to be in a floating status. Thus, when power is applied from the outside to both ends of the terminal of the electric motor 122, the locking rod is moved to the unlock position. This allows the steering shaft to be rotated freely to allow the vehicle to be maneuvered. This has caused a risk where a parked vehicle may be stolen. Another disadvantage was that the semiconductors 120 caused a relatively high voltage drop and thus a voltage applied to the electric motor 122 was reduced, thus causing a reduced driving force of the locking rod. Still another disadvantage was that a braking control must be performed when the electric motor 122 is stopped, which requires a long response time for unlocking and locking operations.

In view of the above, it is an objective of the present invention to provide an electric steering lock device that can suppress such a serious failure as the steering shaft becomes in locked status while the vehicle is running so that the vehicle safety can be improved, that is low-cost, and that can prevent the parked vehicle from being stolen.

An electric steering lock device according to the first aspect of the present invention includes: an electric motor; an electric motor control circuit including an operation relay for operating the electric motor and a pair of rotating direction switching relays for switching a rotating direction of the electric motor, and a locking rod displaced by driving of the electric motor, the locking rod being displaced between a lock position at which a steering shaft is locked to prevent the rotation and an unlock position at which the steering shaft is unlocked to allow the rotation. The steering shaft is unlocked by energizing the operation relay in an ON status to allow the electric motor to displace the locking rod to the unlock position. The steering shaft is locked by energizing the operation relay and the pair of switching relays in an ON status respectively to allow the electric motor to displace the locking rod to the lock position.

When a passenger issues an unlocking instruction in the configuration as described above, the operation relay is firstly in the ON status to constitute the unlocking circuit in the electric motor control circuit. As a result, the electric motor is rotated in the unlocking direction. This allows the locking rod to be moved to the unlock position to allow the rotation of the steering shaft, thus allowing the vehicle to be maneuvered. When the passenger issues a locking instruction on the other hand, the operation relay and a pair of switching relays are in an ON status respectively to constitute the locking circuit in the electric motor control circuit. This allows the electric motor to be rotated in the locking direction. As a result, the locking rod is moved to the lock position, thus preventing the steering shaft from being rotated. Even when one of the pair of switching relays for example has a failure and is always in an ON status, the other of the switching relays is in an OFF status. Thus, the electric motor can be prevented from being rotated in the locking direction. When the operation relay has a failure and is always in an ON status on the other hand, the electric motor is continuously rotated in the unlocking direction. Thus, an individual failure of one of the pair of switching relays does not lock the steering shaft. This can suppress a serious failure where the locked status is caused while the vehicle is running, thus improving the vehicle safety. Furthermore, no failure detection circuit for detecting a failure of the electric motor control circuit is required and thus a lower cost can be realized. When compared with a case where the H-bridge-type IC is used, a relay requiring a lower cost is used and thus cost reduction can be achieved. Furthermore, both ends of the terminal of the electric motor in a battery OFF status are in a short circuit status. Thus, the locking rod cannot be maneuvered even when power is applied to both ends of the terminal of the electric motor from outside. Thus, the steering shaft is maintained in a state that the rotation is prevented, thus preventing the parked vehicle from being stolen.

In the electric steering lock device according to the first aspect of the present invention, the electric steering lock device can include a control unit that outputs a first operation signal to the pair of switching relays in order to lock the steering shaft and that outputs a second operation signal to the operation relay when a predetermined time has passed since the output of the first operation signal.

In order to lock the steering shaft in the configuration as described above, the first operation signal is firstly outputted from a control unit to the pair of switching relays. This causes the pair of switching relays to be in an ON status to switch the rotating direction of the electric motor. Next, when a predetermined time has passed since the output of the first signal, the second operation signal is outputted from the control unit to the operation relay. This allows the operation relay to be in an ON status to constitute a locking circuit in the electric motor control circuit. In this manner, the electric motor can be provided in a status where the electric motor can be securely rotated in the locking direction.

BRIEF DESCRIPTION OF THE DRAWINGS

FIG. 7 illustrates one embodiment of the present invention and illustrates the respective operations of an operation relay and a switching relay.

DETAILED DESCRIPTION OF PREFERRED EMBODIMENTS

The following section will describe one embodiment of the present invention with reference to the drawings. FIG. 3 to FIG. 7 illustrate one embodiment of the present invention.

An electric steering lock device 1 of this embodiment has an electric motor control circuit to operate an electric motor 2. This electric motor control circuit includes a first switching relay RY1 and a second switching relay RY2 for switching the rotating direction of the electric motor 2, an operation relay RY3, and a control unit (CPU) 3. The switching relay RY1 is connected to the first port (PORT1) 3a of the control unit (CPU) 3. The switching relay RY2 is connected to the second port (PORT2) 3b of the control unit (CPU) 3. The operation relay RY3 is connected to the third port (PORT3) 3c of the control unit (CPU) 3. The respective relays RY1, RY2, and RY3 and the control unit (CPU) 3 have therebetween diodes 4, 5, and 6 for energizing the respective relays RY1, RY2, and RY3. The electric steering lock device 1 also includes a locking rod (not shown) provided in a steering column of a vehicle. This locking rod is displaced by driving of the electric motor 2 between the lock position at which the steering shaft is locked to prevent the rotation and the unlock position at which the steering shaft is unlocked to allow the rotation.

Figure 1:
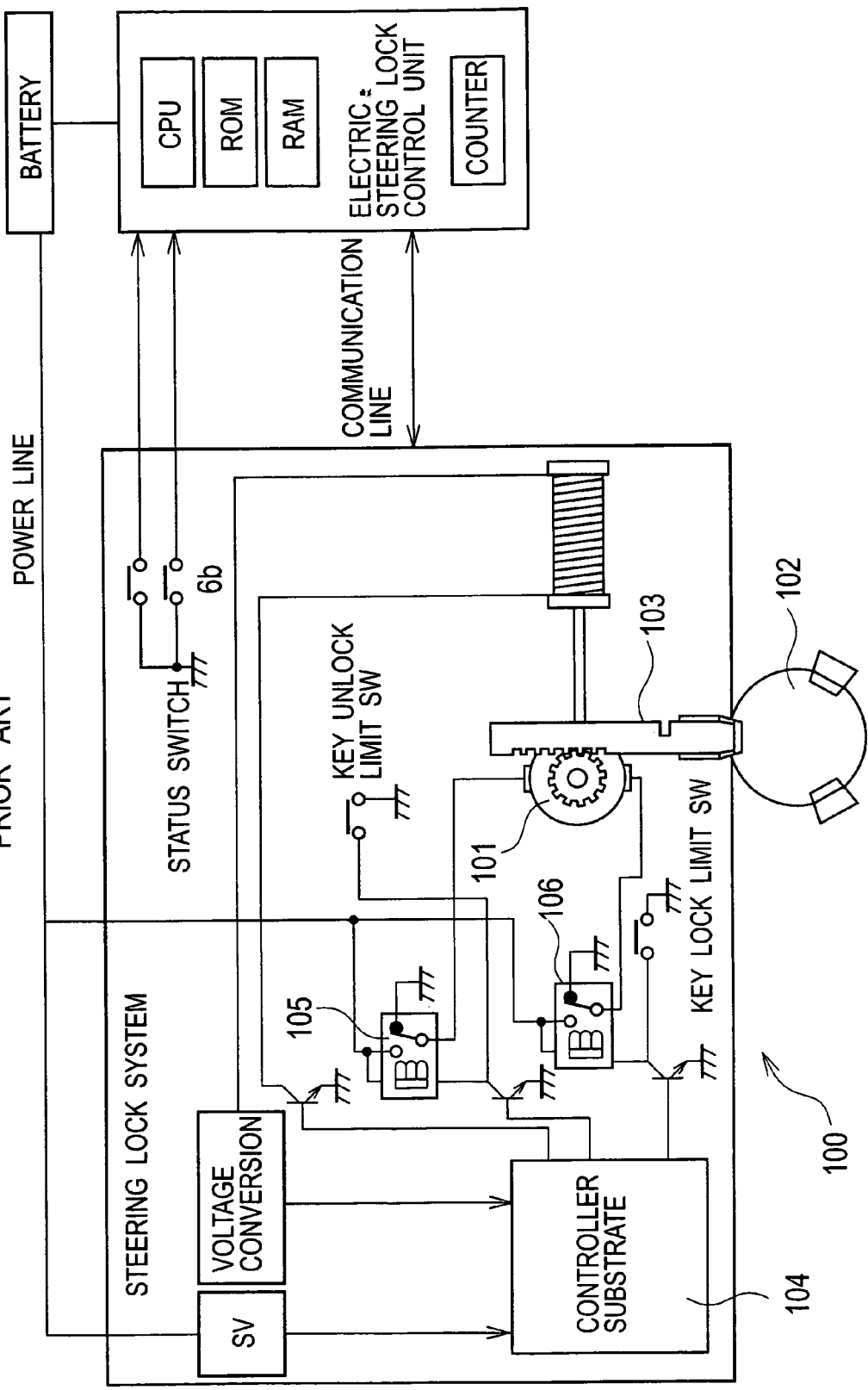
FIG. 1 is a block diagram illustrating a conventional example of an electric steering lock device.
Figure 2:
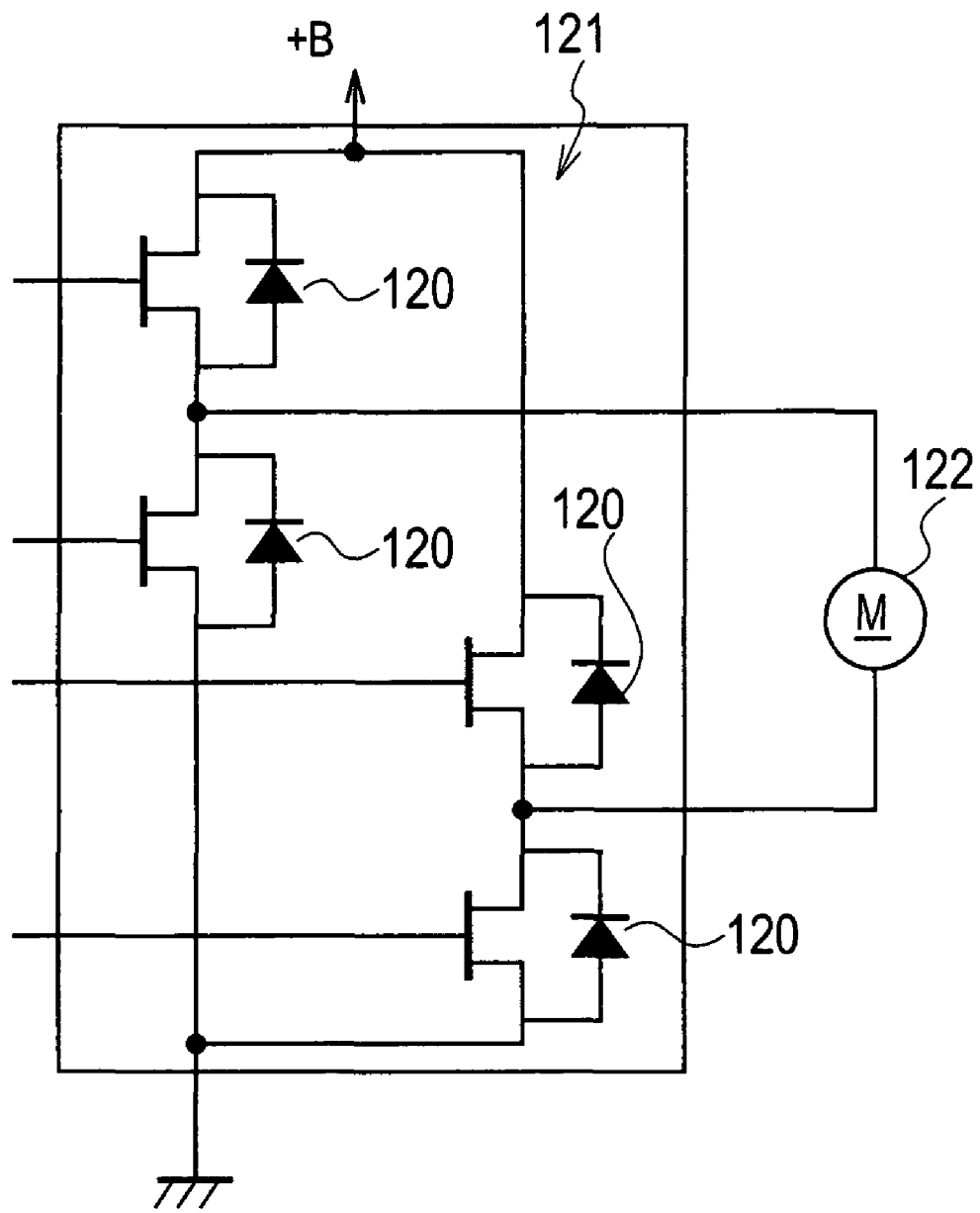
FIG. 2 is a circuit diagram illustrating another conventional example of an electric steering lock device.
Figure 3:
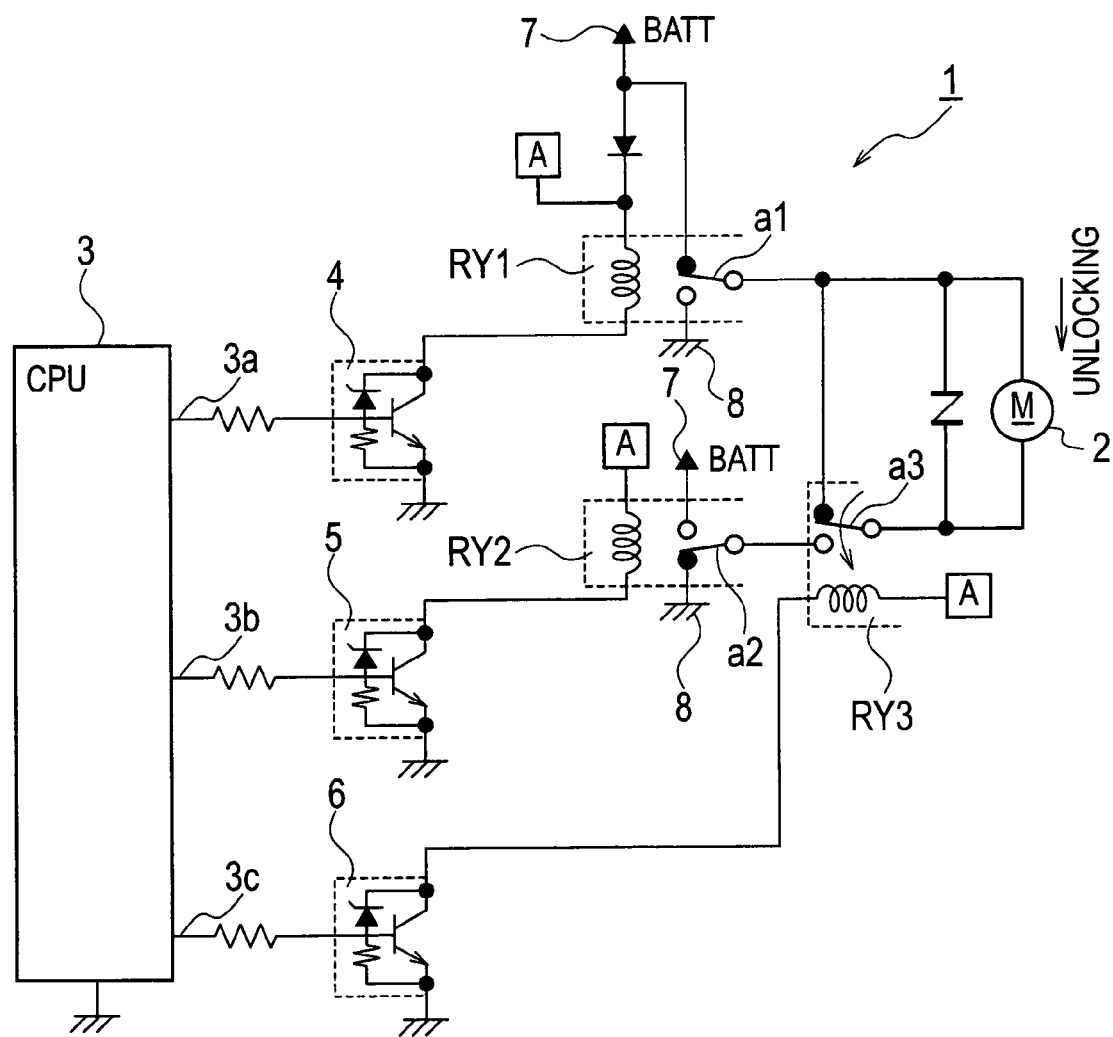
FIG. 3 is a circuit diagram illustrating an electric motor control circuit of one embodiment of the present invention and illustrating an unlocking operation of an electric steering lock device.
Figure 4:
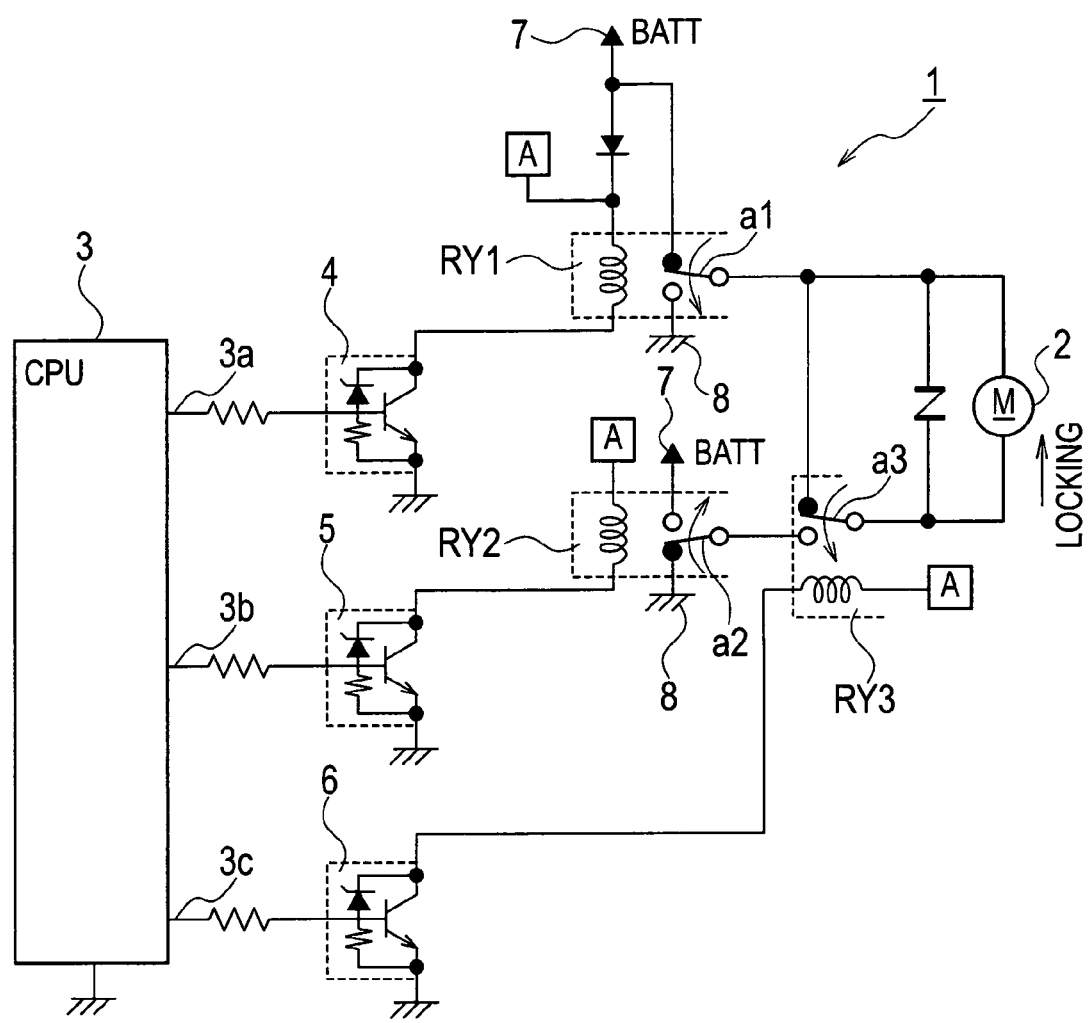
FIG. 4 is a circuit diagram illustrating an electric motor control circuit of one embodiment of the present invention and illustrating a locking operation of the electric steering lock device.
Figure 5:
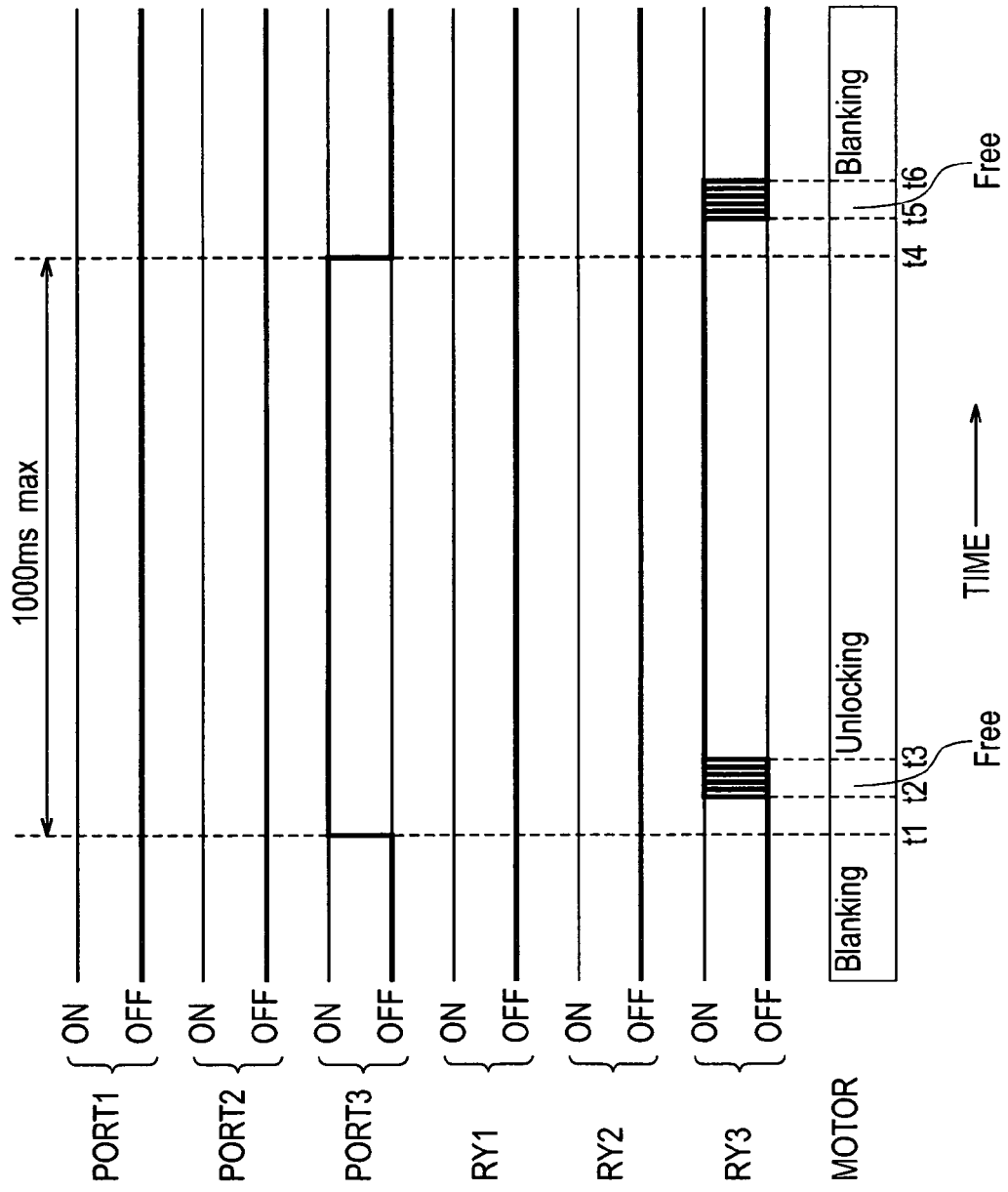
FIG. 5 is a characteristic diagram illustrating one embodiment of the present invention and illustrating the unlocking operation of the electric steering lock device.

As shown in FIG. 3 and FIG. 4, the first switching relay RY1 has a contact point a1 that is switched to the side of a battery 7 in an OFF status and that is switched to the side of ground 8 when the contact point a1 is energized by the diode 4 to be in an ON status. On the other hand, the second switching relay RY2 has a contact point a2 that is switched to the side of the ground 8 in an OFF status and that is switched to the side of the battery 7 when the contact point a2 is energized by the diode 5 to be in an ON status. The operation relay RY3 has a contact point a3 that is switched to the side of the first switching relay RY1 in an OFF status and that is switched to the side of the second switching relay RY2 when the contact point a3 is energized by the diode 6 to be in an ON status.

Next, the following section will describe the operation of an electric motor control circuit provided in the electric steering lock device 1 above mentioned. Normally, the respective contact points a1 and a2 of the switching relays RY1 and RY2 are in an OFF status and the contact point a3 of the operation relay RY3 is in an OFF status during which the electric motor 2 is not energized and thus is stopped. When the third port 3c of the control unit 3 in this status issues an operation signal at the time t1 of FIG. 5, the diode 6 corresponding to this operation signal energizes the operation relay RY3 to be in an ON status. Then, the contact point a3 of the operation relay RY3 is in an ON status at the time t2 as shown in FIG. 3 and is switched to move to the side of the second switching relay RY2. Then, an unlocking circuit is formed that is composed of the battery 7-side, the first switching relay RY1, the electric motor 2, the operation relay RY3, the second switching relay RY2, and the ground 8-side. Thus, the electric motor 2 is rotated in the unlocking direction at the time t3. This allows the locking rod to be moved to the unlock position, which allows the rotation of the steering shaft. Then, the vehicle can be maneuvered.

When the above operation signal is subsequently cancelled at the time t4, the contact point a3 of the operation relay RY3 is switched at the time t5 to the side of the first switching relay RY1. As a result, the above unlocking circuit is cancelled. Then, the electric motor 2 is stopped at the time t6.

Figure 6:
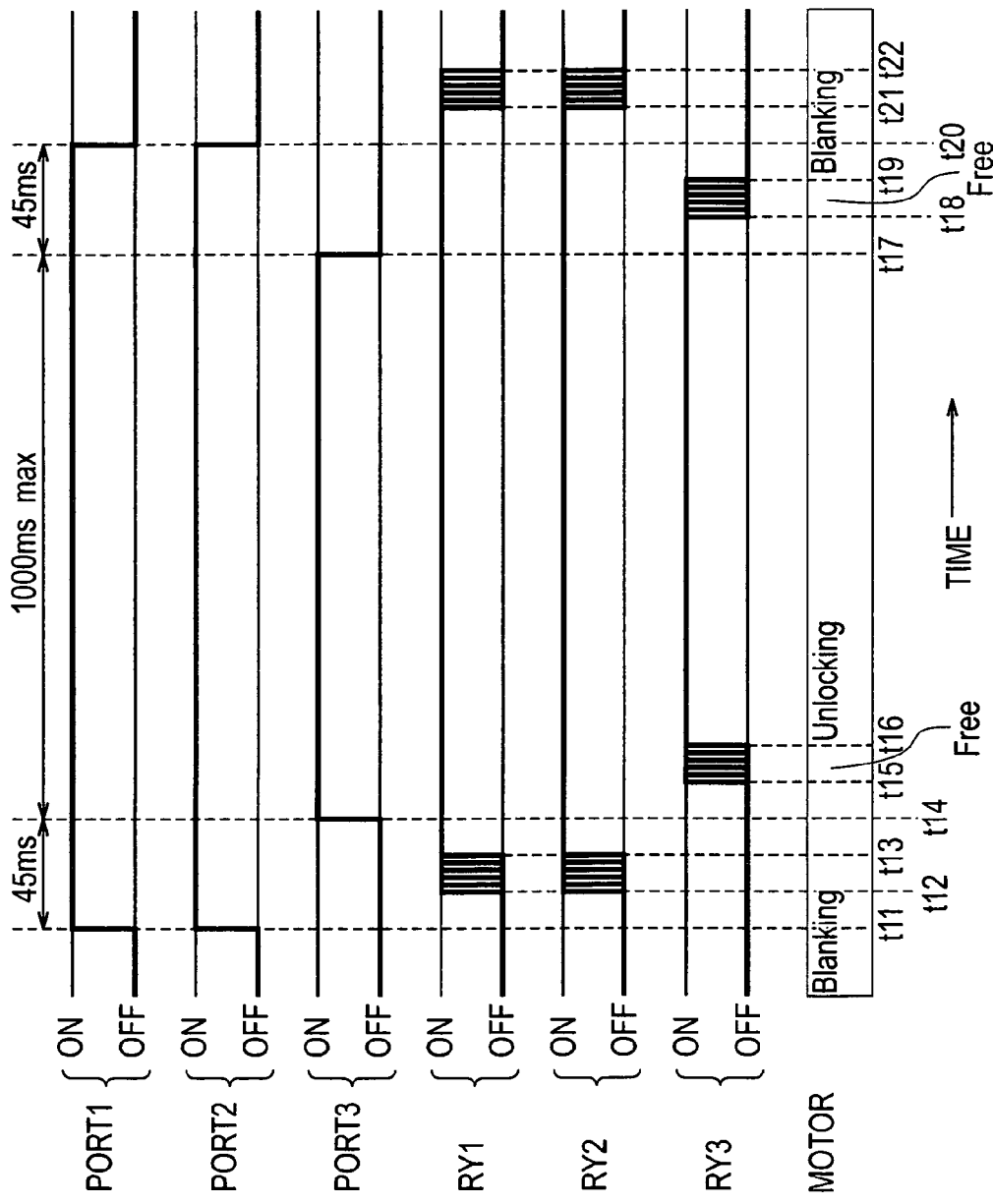
FIG. 6 is a characteristic diagram illustrating one embodiment of the present invention and illustrating the locking operation of the electric steering lock device.

When the first port 3a and the second port 3b of the control unit 3 issue the first operation signal at the time t11 of FIG. 6 while the electric motor 2 being in a stopped status on the other hand, the diodes 4 and 5 energize the switching relays RY1 and RY2 in accordance with this first operation signal at the time t12 to provide an ON status. Then, by the time t13 is reached, the contact point a1 of the first switching relay RY1 is switched to the side of the ground 8 and the contact point a2 of the second switching relay RY2 is switched to the side of the battery 7 as shown in FIG. 4. In this manner, the rotating direction of the electric motor 2 is switched.

Next, when the third port 3c of the control unit 3 issues the second operation signal at the time t14, the diode 6 energizes the operation relay RY3. Then, the contact point a3 of the operation relay RY3 is switched to the side of the second switching relay RY2 at the time t15. Then, a locking circuit is formed that is composed of the battery 7-side, the second switching relay RY2, the operation relay RY3, the electric motor 2, the first switching relay RY1, and the ground 8-side. Thus, the electric motor 2 is rotated in the locking direction at the time t16. As a result, the locking rod is moved to the lock position to prevent the steering shaft from being rotated. Then, the vehicle cannot be maneuvered.

Thereafter, when the above second operation signal is cancelled at the time t17, the operation relay RY3 is de-energized at the time t18 to switch the contact point a3 to the side of the first switching relay RY1. This allows the above locking circuit to be cancelled and the electric motor 2 is stopped at the time t19. Next, when the first operation signal is cancelled at the time t20, the diodes 4 and 5 de-energize the switching relays RY1 and RY2 at the time t21. Then, the contact point a1 of the first switching relay RY1 is switched to the side of the battery 7 and the contact point a2 of the second switching relay RY2 is switched to the side of the ground 8. In this manner, the above locking circuit is cancelled by the time t22 is reached.

As described above, in the present invention, even when one of the pair of switching relays RY1 and RY2 has a failure and is always in an ON status as shown in FIG. 7, the other of the switching relays RY1 and RY2 is in an OFF status. Thus, the above failure prevents the electric motor 2 from being rotated in a locking direction. Thus, the rotation of the steering shaft can be prevented from being blocked. Thus, an individual failure of one of the pair of switching relays RY1 or RY2 does not lock the steering shaft. This can suppress a serious failure where the locked status is caused while the vehicle is running, thus improving the vehicle safety. Furthermore, a failure detection circuit for detecting a failure of the electric motor control circuit 10 is not required and thus a lower cost can be realized. When the operation relay RY3 has a failure and is always in an ON status, the electric motor 2 is continuously rotated in the unlocking direction. However, the rotation of the steering shaft is allowed even when the vehicle is running for example. Thus, the vehicle can be maneuvered and thus no serious problem is caused from a viewpoint of vehicle safety.

The present invention also uses the relays RY1, RY2, and RY3 that requires a lower cost than the case where the H-bridge-type IC is used, thus achieving cost reduction. In the battery OFF status, both ends of a terminal of the electric motor 2 are in a short circuit status. Thus, even when power is applied from the outside to both ends of the terminal of the electric motor 2, the locking rod cannot be maneuvered. Thus, the rotation of the steering shaft is blocked and thus the vehicle cannot be maneuvered thus preventing the parked vehicle from being stolen. Furthermore, when compared with the operation by a semiconductor, the operation by the relays RY1, RY2, and RY3 causes a relatively small voltage drop. Thus, a higher voltage is applied to the electric motor 2 and a higher force for driving the locking rod is provided. Furthermore, no braking control is required to stop the electric motor 2, thus reducing the response time for unlocking and locking operations.

Also according to the present invention, in locking operation, a locking circuit of the electric motor 2 is formed after the rotating direction of the electric motor 2 is switched by the control of the control unit 3. Thus, the electric motor 2 is securely rotated in the locking direction.

What is claimed is:

1. An electric steering lock device, comprising;
   an electric motor;
   a battery driving the electric motor;
   an electric motor control circuit including
      an operation relay for operating the electric motor, and
      a pair of rotating direction switching relays for switching a rotating direction of the electric motor; and
   a locking rod that is displaced by driving of the electric motor, the locking rod being displaced between a lock position at which a steering shaft is locked to prevent rotation and an unlock position at which the steering shaft is unlocked to allow rotation,
   wherein:
      normally, the operation relay and the pair of rotating direction switching relays are in an OFF status respectively;
      when the operation relay is in an OFF status, the electric motor is stopped and both ends of a terminal of the electric motor are in a short circuit status;
      when both ends of the terminal of the electric motor are in a short circuit status both ends of the terminal of the electric motor are grounded or connected to the battery;
      when the operation relay is energized in an ON status, the short circuit status of both ends of terminal of the electric motor is cancelled;
      when the pair of rotating direction switching relays are in an OFF status and when the operation relay is energized in an ON status, the electric motor displaces the locking rod to the unlock position whereby the steering shaft is to be unlocked; and
      when the operation relay and the pair of switching relays are energized in an ON status respectively, the electric motor displaces the locking rod to the lock position whereby the steering shaft is to be locked.

2. The electric steering lock device according to claim 1, further comprising a control unit that, when the steering shaft is to be locked, outputs a first operation signal to the pair of switching relays and that outputs a second operation signal to the operation relay after predetermined time has passed since the output of the first operation signal.

* * * * *